United States Patent

[11] 3,542,056

[72] Inventors George I. Chinn;
 Henry P. Meissner, Middletown, New York
[21] Appl. No. 844,330
[22] Filed July 24, 1969
[45] Patented Nov. 24, 1970
[73] Assignee Keiley & Mueller Inc.
 Middletown, New York
 a corporation of New York

[54] REVERSIBLE CAGE TRIM VALVE
 9 Claims, 4 Drawing Figs.
[52] U.S. Cl.......................................... 137/271
[51] Int. Cl............................................. F16k 15/00
[50] Field of Search.................................. 137/271,
 269, 270, 269.5, 270.5; 251/290

[56] References Cited
UNITED STATES PATENTS
| 1,661,190 | 3/1928 | Mead | 137/271 |
| 1,971,304 | 8/1934 | Mueller | 137/270X |
| 2,409,091 | 8/1946 | Wright | 137/270X |
| 3,106,936 | 10/1963 | Trautman | 137/269 |
| 3,123,091 | 3/1964 | Elsey | 137/270 |

Primary Examiner—Laverne D. Geiger
Assistant Examiner—Robert J. Miller
Attorney—Kenyon & Kenyon Reilly Carr & Chapin ABSTRACT: The valve is constructed with an inner valve which is formed to threadably engage a valve stem from either end. The inner valve and related valve seat and cage can then be used for either direct action or reverse action. Also, the inner valve is provided with passages and the cage is provided with apertures, either of which can be plugged so as to permit the use of the valve in a balanced pressure condition or an unbalanced pressure condition.

Patented Nov. 24, 1970

INVENTORS
GEORGE I. CHINN
BY HENRY P. MEISSNER

Kenyon & Kenyon
ATTORNEYS

INVENTORS
GEORGE I. CHINN
BY HENRY P. MEISSNER
Kenyon & Kenyon
ATTORNEYS

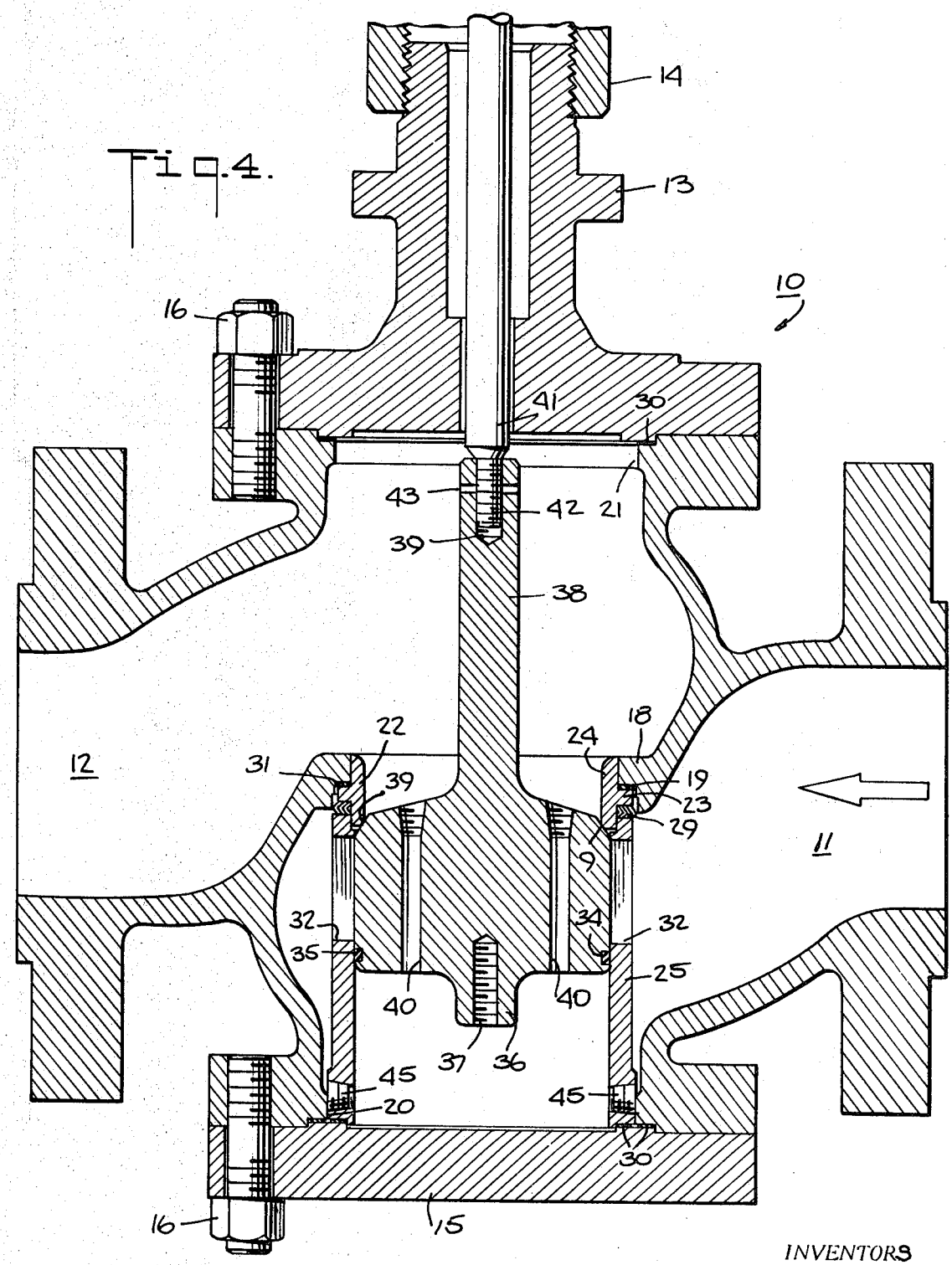

REVERSIBLE CAGE TRIM VALVE

This invention relates to a reversible cage trim valve. More particularly, this invention relates to a cage trim valve having a reversible inner valve.

Various valves have been known for regulating the flow of a liquid or gas through a pipeline. In some instances, these valves have been constructed to operate as direct acting valves, that is, valves in which an inner valve connected to a valve stem passing through the housing of the valve is caused to move against a valve seat within the valve with downward motion of the valve stem. In other instances, the valves have been constructed to function as reverse acting valves, that is, valves in which the inner valve moves away from the valve seat with downward motion of the valve stem. In both instances, the seat ring is usually a member threadably engaged by the valve body.

Because of damage sustained by the seat ring and inner valve from erosion and corrosion, or from other causes, it is necessary at intervals to replace these parts. Particularly susceptible to damage are the threads of the seat ring, making replacement of the ring a time consuming and expensive operation. In order to eliminate this condition, valves have been made of the cage, or quick-change trim type. In these instances, the seat ring is retained in the body by a cage which in turn is retained by the valve bonnet; and the inner valve is guided in this cage upon being moved axially with respect to the seat ring.

Most cage trim valves are designed to require insertion of the trim members through the top of the valve body. However, this restricts the design to the use of direct acting inner valves. Furthermore, in order to remove the trim, the actuator must be lifted from the valve. This not only necessitates disconnecting electrical and pneumatic control connections but, where the actuators are large, mechanical lifting equipment. The use of reverse acting inner valves which must be inserted through an opening in the bottom of the valve, eliminates the necessity for removing the actuator. On the other hand, insufficient room between the bottom of the valve and the ground or floor can prevent removal of the reverse acting inner valves Consequently, there is a requirement for both direct acting and reverse acting quick-change inner valves Accordingly, it is an object of the invention to provide a valve with a plurality of interchangeable parts so as to function as a direct acting or a reverse acting valve.

It is another object of the invention to provide a cage trim valve with a reverse acting inner valve.

It is another object of the invention to provide for a pressure balanced or unbalanced operation of a valve with the use of a minimum number of parts.

It is another object of the invention to provide a valve which can be readily disassembled in the field.

It is another object of the invention to provide a valve in which a valve seat can be easily and quickly removed.

It is another object of the invention to provide a system of gasket seals which can accommodate dimensional variations in the valve members and movement of these members by thermal expansion and fluid forces.

Briefly, the invention provides a cage trim valve which is capable of direct action or reverse action with the use of a minimum number of parts. The valve is constructed with a valve housing which is substantially symmetrically formed with inlet and outlet ports and with a valve seat between the ports. In addition, the valve includes a valve seat ring which is mounted on the valve seat and an inner valve which is sized to sealingly seat on the valve seat ring and to be guided within a cage within the housing. The inner valve is secured to a valve stem which, in turn, is connected to a suitable actuator assembly of known structure mounted on a bonnet secured to the valve housing. Suitable seals are also provided between the valve seat ring and valve seat and between the cage and the valve seat ring and valve housing so as to seal against the flow of liquid or gas around the valve body when the valve body is seated on the valve seat ring.

In order to permit the valve to act as a direct acting or a reverse acting valve, the valve housing is sized to have two chambers disposed on opposite sides of the valve seat of substantially identical proportions in order to receive the cage in a sealed relation while communicating with the inlet and outlet ports of the valve. The chambers are also in communication with respective openings in the housing which provide access to the chambers for insertion and removal of the cage and valve seat ring. These openings are closed in a seal tight relation by a plate to one side of the valve seat and the bonnet to the other side which houses the valve stem. Both the plate and the bonnet are removable secured to the valve housing so as to permit rapid disassembly.

In use, should it be desired to use the valve as a direct acting valve, the plate is secured in place and the valve seat ring, cage, inner valve and valve stem are moved into the valve housing from the opposite side and the bonnet secured to that opposite side. In order to function as a reverse acting valve, the position of the bonnet and plate are interchanged, because of the symmetry of the valve housing and the valve stem is threaded into the opposite end of the inner valve.

The valve of the invention can also be used for a balanced pressure condition or unbalanced pressure condition. To this end, the inner valve is provided with a pair of elongated passages which pass from one side to the other while the cage is provided with a plurality of apertures which connect the interior of the cage with the exterior of the cage. In addition, the passages in the inner valve and the apertures in the cage are sized to selectively block the passages in the inner valve or the apertures in the cage. In use, for example, when the valve acts as a balanced valve, the passages in the valve body are open to the flow of fluid or gas while the apertures in the cage are sealed off by the plugs. This allows equal pressure to be imposed on opposite sides of the inner valve in order to avoid any undue force on the valve stem. In order to use the valve in an unbalanced pressure condition, the passages in the valve body are plugged while the apertures in the cage are open to the flow of fluid or gas. This allows an unbalance of pressure between the opposite sides of the inner valve.

These and other objects and advantages of the invention will become more apparent from the following detailed description and appended claims taken in conjunction with the accompanying drawings in which:

FIG. 4 illustrates a cross-sectional view similar to FIG. 3 in which the valve is constructed for reverse action.

Figures 1, 2:
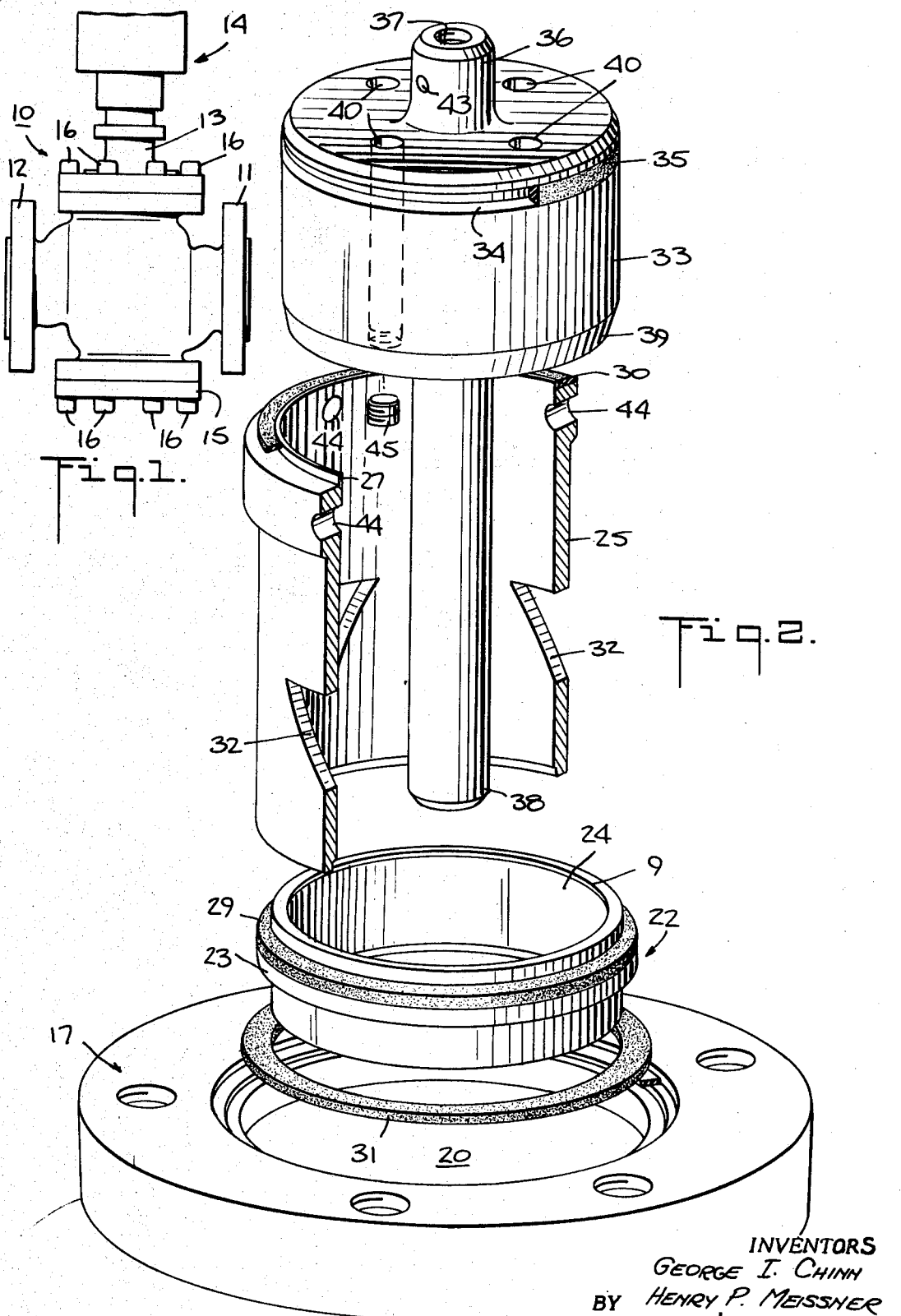
FIG. 1 illustrates a view of a valve according to the invention.
FIG. 2 illustrates an exploded view of an inner valve, cage and valve seat ring of the valve according to the invention.

Referring to FIG. 1, the valve 10 is constructed with a pair of ports 11, 12 on opposite sides. In addition, the upper end of the valve 10 mounts a bonnet 13 which communicates with an actuator assembly 14, as is known, while the opposite bottom end of the valve 10 is closed by a plate 15. Both the bonnet 13 and plate 15 are secured, as by bolts 16, to the valve 10. As shown, the ports 11, 12 are flanged so as to provide suitable seats for the respective members or pipe sections (not shown) to which the valve connects.

Figure 3:
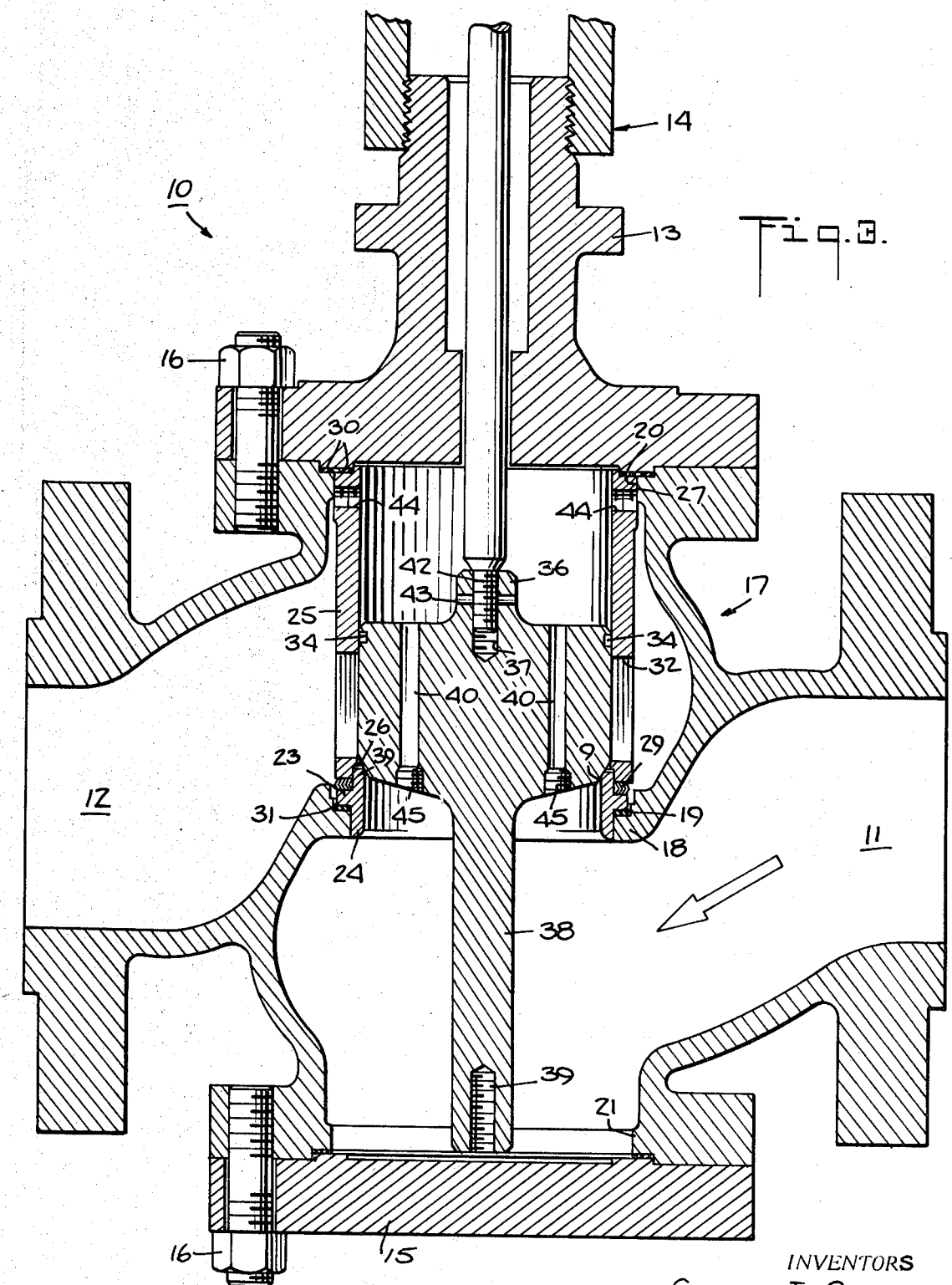
FIG. 3 illustrates a cross-sectional view of a valve according to the invention with the various components disposed for direct action.

Referring to FIG. 3, the valve 10 is constructed with a housing 17 in which the ports 11, 12 are disposed in substantially symmetrical relationship. In addition, a valve seat 18 is disposed between the ports 11, 12 so as to communicate the ports 11, 12 with each other for the passages of a liquid or gas therethrough. As shown, the valve seat 18 is substantially cylindrical and includes an annular shoulder or recess 19. The valve seat 18 is further disposed between a pair of openings 20, 21 in the valve housing 17 over which the plate 15 and bonnet 13 are secured in seal tight relation. The valve 10 further includes a seat ring 22 which has a radially outwardly extending flange 23 seated in the shoulder 19 of the valve seat 18 and a cylindrical annular section 24 substantially coaxially of the valve 18. In addition, the ends of the cylindrical section 24 are formed as sealing surfaces 9, for example, by machining.

In order to maintain the seat ring 22 in place in the valve seat 18, a cylindrically shaped annular cage 25 is disposed between the seat ring 22 and the bonnet 13. This cage 25 is provided with a cylindrical opening 26 at one end for guiding on the exterior of the cylindrical section 24 of the valve seat ring 22 with a cylindrical surface 27 at the opposite end for guiding within the opening 20 of the body 17. In addition, the cage cooperates with a resilient spring seal 29, such as a spiral wound steel strip of triangular shape, located between the valve seat ring 22 and the cage 25 which functions when compressed to urge the valve seat ring 22 against the valve seat 18; the compression of the seal 29 being effected by the securing in place of the bonnet 13 against the cage 25. Additionally, suitable seals 30, 31 are provided between the valve seat 18 and the seat ring 22 and between the cage 25 and the bonnet 13 to provide a fluid tight boundary between the respective ports 11, 12 of the valve 10.

In order to regulate the flow, the cage 25 is provided with a plurality of ports 32, for example, four, which are of triangular shape; the apex of the triangle being directed towards the seat ring 22. In this way, as the valve is opened the flow of fluid increases at an increasing rate and as the valve closes at a decreasing rate.

The valve 10 also includes an inner valve 33 which is slidably disposed within the cage 25 to move axially in the cage 25. The inner valve 33 is provided with a suitable circumferential recess 34 in which a seal 35 such as an O-ring or piston ring, is positioned (FIG. 4) so as to seal the inner valve 33 with respect to the interior of the cage 25 and thus prevent a flow of liquid between the inner valve 33 and the cage 25. In addition, the inner valve 33 is provided with a relatively short stub extension 36 which is provided with an internally threaded bore 37 and with a relatively long elongated extension 38 which is likewise provided with an internally threaded bore 39. These extensions 36, 38 are disposed on opposite sides of the inner valve 33 axially of each other and the axis of the cage 25. The inner valve 33 also has an annular tapered sealing surface 39 which is sized to mate with a tapered sealing surface 9 of the seat ring 22. To this end, the cage 25 is provided with a larger internal diameter than the diameter of the sealing surface 9 of the seat ring 22 so that the sealing surfaces 39 of the inner valve 33 can come into mating contact with the seat ring sealing surface 9. Finally, the inner valve 33 is provided with a plurality of elongated passages 40, for example, two, which connect opposite sides of the inner valve 33.

The actuator assembly 14 which is constructed in a known manner has a valve stem 41 which extends through the bonnet 13 and which is provided with a threaded extension 42 sized to thread into either bore 37, 39 of the inner valve extensions 36, 38. The valve stem 41 is actuated by the actuator assembly 14 so as to be reciprocated within the bonnet 13 in order to cause the inner valve 33 to slide within the cage 25 relative to the seat ring 22. In order to fix the valve stem 41 to the extension 36, the threaded extension 42 of the valve stem 41 and the extensions 36, 38 of the inner valve are provided with openings for the passage of a pin 43 therebetween to lock the valve stem 41 to the inner valve 33.

The extension 38 of the inner valve is sized so that the sealing surface 39 of the inner valve 33 contacts the sealing surface 9 of the seat ring 22 on the closing stroke before the extension 38 can come in contact with plate 15, for direct action, or bonnet 13, for reverse action, to prevent valve closure. Similarly, the extension 36 is sized so that contact between the extension 36 and the bonnet 13, for direct action, or plate 15, for reverse action, produces the correct stroking distance.

The chambers within the housing 17 which communicate with the inlet and outlet ports 11, 12 are of similar dimensions so as to permit the bonnet 13 and plate 15 to be secured over either of the opposite openings 20, 21. Thus, the valve 10 can be constructed for either direct action or reverse action by a simple interchanging of the bonnet 13 and plate 15.

Referring to FIGS. 2 and 3, in order to permit a quick removal of the seat ring 22, the bolts 16 securing the bonnet 13 to the flange around the opening 20 of the valve housing 17 are loosened and removed. The bonnet 13 is then removed along with the valve stem and inner valve secured thereto. Next, the seal 30 and the cage 25 are lifted from within the housing 17 and thereafter the spring 29 is removed with the seat ring 22. The seat ring 22 can then either be placed back into the valve or can be replaced by a fresh seat ring. The spring 29 is then placed back into the housing about the seat ring 22. The cage 25 is also reinserted along with the seal 30 at the upper end and the bonnet 13 is placed over the opening 20 with the inner valve 33 and the valve stem 41 in place and bolted to the housing 17.

Referring to FIG. 4, in the event that it is desired to use the valve as a reverse acting valve, the bottom plate 15 and bonnet 13 are removed from the housing 17. The housing 17 is then rotated 180° about the axis of the ports 11, 12 with the inner valve 33, stem 41, seat ring 22, spring 29 and cage 25 positioned therein. The stem 41 is then threaded into the longer extension 38. The bonnet 13 is then installed over the stem 41 and attached to the housing 17, and the plate 15 is attached to the housing 17 at the opening 20.

In order to use the valve 10 for a balanced or unbalanced pressure condition, the cage 25 is provided with apertures 44 near the end opposite the end seated on the seat ring 22 and suitable plugs 45, such as threaded metal plugs are provided for selectively sealing the passages 40 in the inner valve 33 of apertures 44 in the cage 25. The passages 40 and apertures 44 are sized with similar cross-sectional dimensions so that the same plug 45 can be fitted into both. In order to provide for an unbalanced condition, for example, in the direct acting valve shown in FIG. 3, the plugs 45 are inserted in the passages 40 of the inner valve 33 while the openings 44 remain unblocked. Thus, the pressure on the inlet side of the inner valve 33 is allowed to be different from the pressure on the outlet side so that an unbalanced pressure condition is created. On the other hand, in order to create a balanced pressure condition, the plugs 45 would only be inserted in the apertures 44 of the cage 25 while the passages 40 of the inner valve 33 remain open to connect opposite sides of the valve body with each other. In this respect, the pressure would be equal on opposite sides of the inner valve 33. Referring to FIG. 4, in order to create an unbalanced condition on the inner valve 33 of the reverse acting valve the passages 40 in the inner valve 33 would be plugged up by the plugs 45 while the apertures 44 of the cage 25 would be open. Similarly, in order to create an unbalanced condition, the passages 40 in the inner valve 33 are closed while the apertures 44 in the cage 25 are open. Further, the seal 35 would be installed in the circumferential recess 34.

The invention thus provides a cage trim valve which can be utilized as a reverse acting or a direct acting valve. The reversible inner vale, and the valve seat ring are further sized so as to be utilized in either condition of the valve. Furthermore, the valve is provided with a housing having a removable cover plate and a bonnet at opposite sides so as to permit insertion of the valve body and seat ring from either the top or the bottom opening in a relatively easy and quick manner.

The invention also provides a valve which is simple to assembly and disassemble in the field thereby reducing maintenance time and cost.

We Claim:
1. A reversible cage trim valve comprising:
  a housing having a ring seat therein and a pair of openings therein disposed on opposite sides of said ring seat;
  a seat ring sealingly mounted on said ring seat;
  a cage mounted between one of said openings and said seat ring;
  an inner valve slidably mounted in said cage for seating engagement with said seat ring and having a first extension in one end and a second extension on the opposite end of longer length than said first extension; and means selectively secured to one of said extensions of said inner valve and extending through one of said openings in said housing for sliding said inner valve within said cage relative to said seat ring.

2. A reversible cage trim valve as set forth in claim 1 wherein said means is secured to said first extension of said inner valve, and said means and said first extension are located on the same side of said seat ring.

3. A reversible cage trim valve as set forth in claim 1 wherein said means is secured to said second extension of said inner valve, and said means and said second extension are located on opposite sides of said seat ring.

4. A reversible cage trim valve as set forth in claim 1 which further comprises a plate removably mounted on said housing over one of said openings and said means includes a bonnet removably secured on said housing over the other of said openings.

5. A reversible cage trim valve as set forth in claim 4 wherein said cage is sealingly mounted between said bonnet and said seat ring.

6. A reversible cage trim valve as set forth in claim 4 wherein said cage is sealingly mounted between said plate and said seat ring.

7. A reversible cage trim valve as set forth in claim 1 wherein said seat ring has a flange seated on said ring seat and a cylindrical section having a sealing surface at one end thereof, said sealing surface projecting inwardly of said cage for sealingly engaging said inner valve.

8. A reversible cage trim valve as set forth in claim 7 wherein said valve body has at least one passage connecting opposite sides of said valve body, said cage has at least one aperture passing therethrough near the end opposite the end adjacent said seat ring, and at least one plug is selectively mounted in either of said passage or aperture whereby the valve is adapted for an unbalanced or balanced pressure condition.

9. A reversible cage trim valve as set forth in claim 5 wherein a spring member maintains sealing contact between said cage, seat ring, bonnet and plate.

UNITED STATES PATENT AND TRADEMARK OFFICE
CERTIFICATE OF CORRECTION

PATENT NO. : 3,542,056

DATED : November 24, 1970

INVENTOR(S) : George I. Chinn

It is certified that error appears in the above-identified patent and that said Letters Patent is hereby corrected as shown below:

On the title page, assignee's name should read

-- Kieley & Mueller Inc., Middletown, N. Y. --

Signed and Sealed this

Twenty-third Day of November 19

[SEAL]

Attest:

GERALD J. MOSSINGHOFF

Attesting Officer     Commissioner of Patents and Trademarks